United States Patent [19]

Fukushima

[11] 4,205,244
[45] May 27, 1980

[54] MICRO STEPPING MOTOR

[75] Inventor: Yasuhiro Fukushima, Ichikawa, Japan

[73] Assignee: Kabushiki Kaisha Daini Seikosha, Japan

[21] Appl. No.: 760,828

[22] Filed: Jan. 21, 1977

Related U.S. Application Data

[62] Division of Ser. No. 556,200, Mar. 6, 1975, abandoned.

[30] Foreign Application Priority Data

| Mar. 7, 1974 | [JP] | Japan | 49-26655 |
| Jun. 25, 1974 | [JP] | Japan | 49-72509 |
| Jul. 8, 1974 | [JP] | Japan | 49-78098 |
| Jul. 8, 1974 | [JP] | Japan | 49-80436[U] |
| Aug. 29, 1974 | [JP] | Japan | 49-103672[U] |

[51] Int. Cl.² ................................ H02K 37/00
[52] U.S. Cl. ..................... 310/49 R; 310/40 MM; 310/112
[58] Field of Search ................ 310/162–165, 310/156, 83, 49, 190–193, 40 MM

[56] References Cited

U.S. PATENT DOCUMENTS

| 1,913,179 | 6/1933 | Warren | 310/163 X |
| 2,001,914 | 5/1935 | Lenchan | 310/163 X |
| 3,142,774 | 7/1964 | Lundin | 310/83 |
| 3,370,189 | 2/1968 | Haydon et al. | 310/49 |
| 3,818,690 | 6/1974 | Schwarzschild | 310/49 X |
| 3,979,616 | 9/1976 | Stechmann | 310/49 |
| 4,041,336 | 8/1977 | Sudler et al. | 310/49 |

Primary Examiner—Donovan F. Duggan
Attorney, Agent, or Firm—Robert E. Burns; Emmanuel J. Lobato; Bruce L. Adams

[57] ABSTRACT

A micro stepping motor for use in compact watches and the like comprises a magnetic core, a coil winding wound on the magnetic core, and a stator formed as one rigid body and connected to the magnetic core to define therewith a closed magnetic flux path. The stator has a necked portion along its length and a hole extends through the stator at the center portion of the necked portion. A rotor having at least one pair of magnetic poles is rotatably disposed within the stator hole with an air gap therebetween. The rotor rest position is determined by either a protrusion on the stator extending into the air gap forming a region of minimum reluctance or a recess in the stator opening into the air gap forming a region of maximum reluctance for the rotor flux.

10 Claims, 17 Drawing Figures

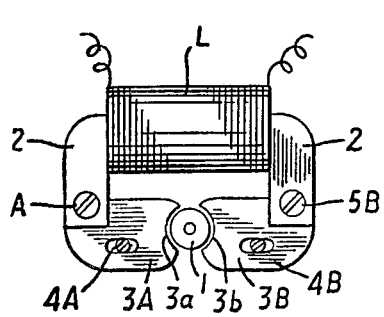
PRIOR ART FIG. 1
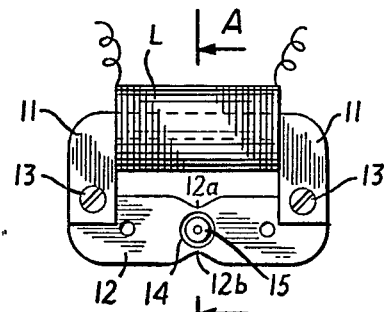
FIG. 2
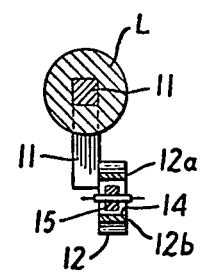
FIG. 3
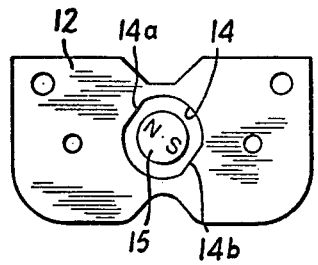
FIG. 4
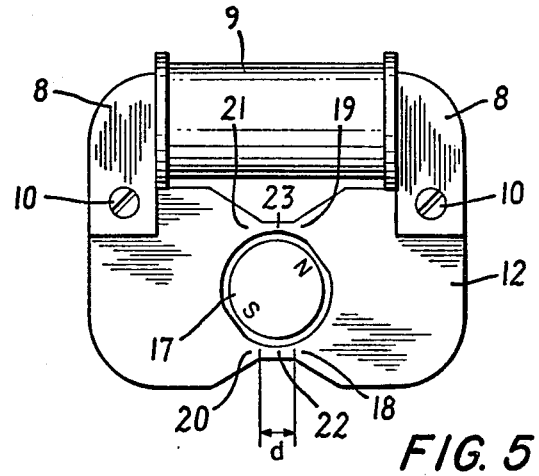
FIG. 5
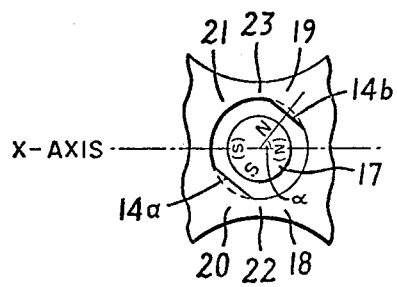
FIG. 6
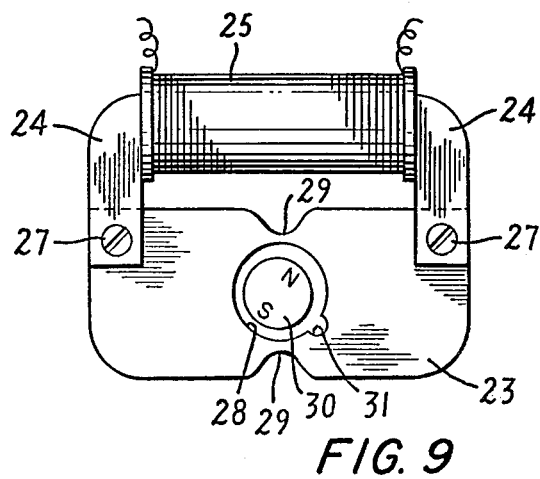
FIG. 9
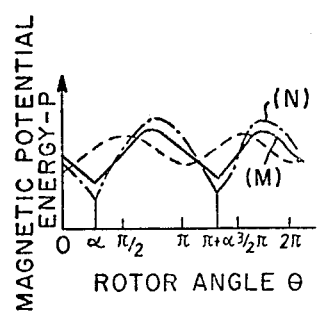
FIG. 7
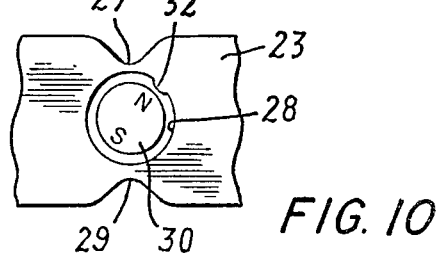
FIG. 10

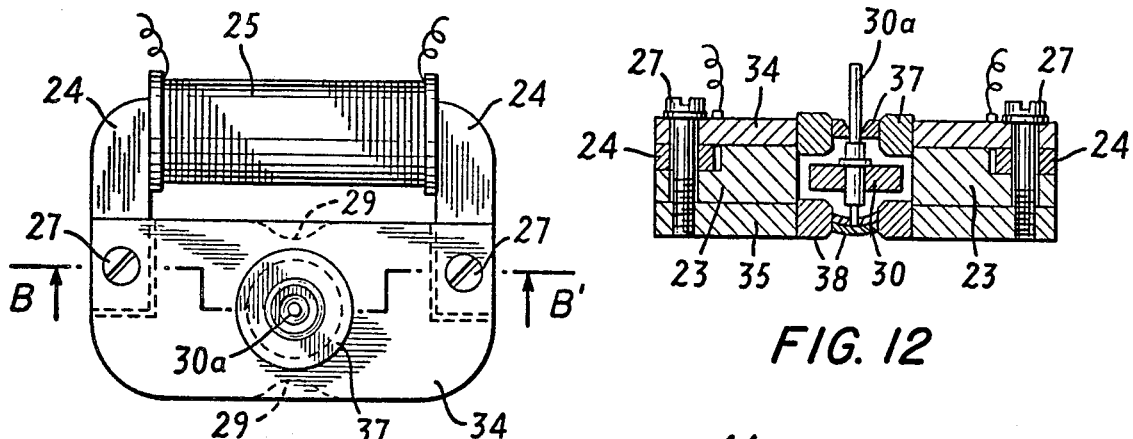
FIG. 11      FIG. 12
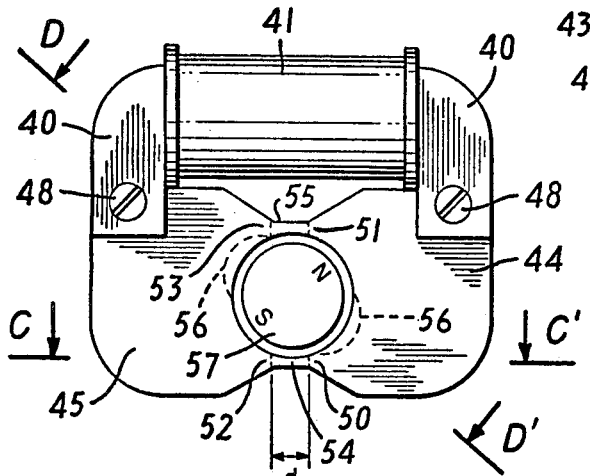
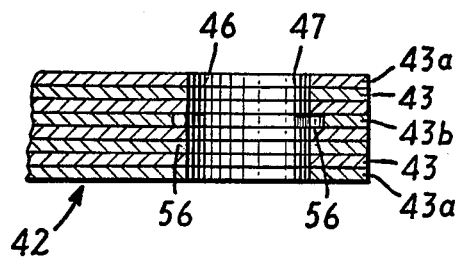
FIG. 14
FIG. 13
FIG. 15
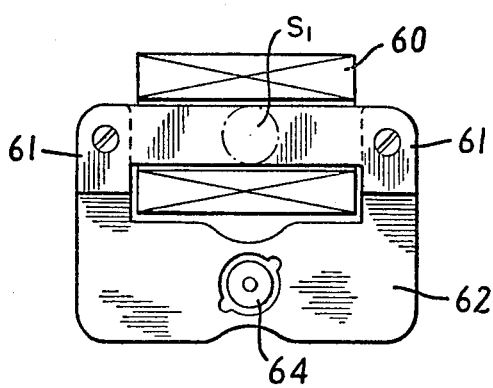  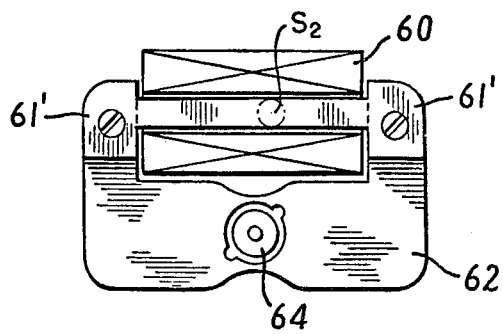
FIG. 16      FIG. 17

000
MICRO STEPPING MOTOR

This is a divisional, of application Serial No. 556,200, filed Mar. 6, 1975, now abandoned.

BACKGROUND OF THE INVENTION

The conventional type of a micro stepping motor such as shown in FIG. 1 comprises a rotor 1, a magnetic core 2 having a coil winding L, a stator constructed of two stator pieces 3A and 3B which are fixed to the magnetic core 2 and are opposed with respect to each other around the rotor. The eccentric pins 4A and 4B are respectively positioned in long holes provided in stator pieces 3A and 3B. It is necessary to accurately adjust the position of said stator pieces 3A and 3B by means of said eccentric pins 4A and 4B for driving the motor in the best condition.

Further, it is difficult to mass-produce and finish the circular portion 3a and 3b of said stator pieces 3A and 3B with a high degree of accuracy. Moreover, the stationary position of said rotor is decided by the fixing phase said stator pieces 3A and 3B after variably adjusting them to obtain the best motor operating condition.

OBJECT OF THE INVENTION

The present invention aims at eliminating the above noted difficulty and therefore it is the primary object of the present invention to provide a new micro stepping motor construction having a one-piece stator which functions as the two stator elements of the conventional stator.

Further object of the present invention is to provide an improved micro stepping motor wherein a one-piece stator surrounding a rotor is formed of a sheet of plate material so as to eliminate the need for making an adjustment of the air gap between said stators and said rotor.

SUMMARY OF THE INVENTION

According to the present invention, there is provided a micro stepping motor for an electronic timepiece having a rotor composed of a permanent magnet, a stator which has a circular hole for positioning said rotor, and a coil winding wound on a core, said stator having a pair of stator portions constructed as one body.

BRIEF DESCRIPTION OF THE DRAWINGS

The above mentioned and further objects, features and advantages of the present invention will become more obvious from the following description when taken in connection with the accompanying drawings which shows one preferred embodiment of the invention and wherein:

FIG. 1 shows a conventional prior art type flat plan view of a micro stepping motor.

FIG. 2 shows a flat plan view of a first embodiment of a micro stepping motor according to the present invention.

FIG. 3 is a cross sectional view taken on the line A—A' in FIG. 2.

FIG. 4 is a enlarged flat plan view of the stator which is suitable to be used in the micro stepping motor according to the present invention.

FIG. 5 is a flat plan view of a second embodiment of the present invention.

FIG. 6 is an enlarged partial view for explaining the mode of operation of the embodiment in FIG. 5.

FIG. 7 is a graph showing the characteristic of the rotor angle and the magnetic potential energy for explaining the operation of the assembly shown in FIG. 6.

FIG. 9 shows a flat plan view of a third embodiment of the micro stepping motor in the present invention.

FIG. 10 shows a partial flat plan view of the stator of the present invention.

FIG. 11 shows a flat plan view of a variant of the micro stepping motor shown in FIG. 9.

FIG. 12 shows a cross sectional view taken from the line B—B' in FIG. 11.

FIG. 13 shows a flat plan view of a fourth embodiment of the stepping motor for a timepiece according to the present invention.

FIG. 14 shows a cross sectional view taken of the stator along the line C—C' of FIG. 13.

FIG. 15 shows a cross sectional view taken along the line D—D' of FIG. 13.

FIG. 16 shows a flat plan view of a fifth embodiment of micro stepping motor according to the present invention.

FIG. 17 shows a flat plan view of a variant of the micro stepping motor shown in FIG. 16.

DETAILED DESCRIPTION OF THE INVENTION

Figure 8:
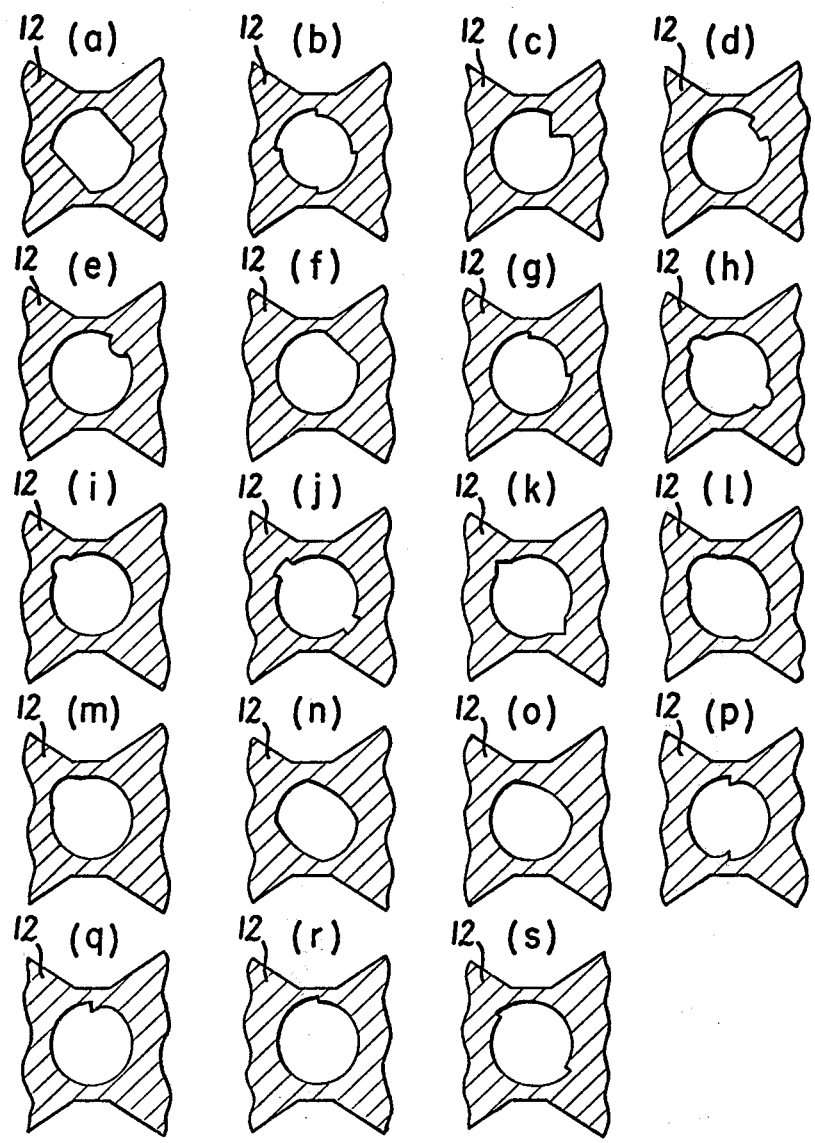
FIG. 8 shows variants of stators having a generally circular portion and being formed as one body for use in the present invention.

Referring now to the accompanying drawings, FIG. 2 shows the first embodiment of a micro stepping motor according the present invention. The motor comprises a magnetic core 11 having an inverse U configuration having a coil winding L which is supplied with a timing pulse current. A stator 12 which is made of a soft magnetic material is fixed to both sides of the magnetic core by means of screw bolts 13 and 13. Said stator 12 is provided in its center with a circular hole 14 in which a magnetic rotor 15 is rotatably mounted to said stator 12. Said stator 12 separate is not formed of two sheets instead is comprised but of a single sheet having two concaved portions such that the total sectional area of opposed concaved portions 12a and 12b is smaller than the sectional area of the magnetic core 11.

In FIG. 4, the stator 12 provided with the circular hole 14 has said rotor 15 rotatably disposed within the hole 14. Said circular hole 14 has straight edges 14a and 14b which are biased at an angle (30° to 60°) from a vertical straight surface corresponding to a straight line A—A' in FIG. 2 in order to determine the stationary positions of the magnetic poles of the rotor. By such a construction, said rotor 15 becomes stationary after the magnetic poles thereof are attracted to said straight edges 14a and 14b of said stator 12, which has narrow air gaps therebetween, when the coil L does not generate a magnetomotive force. However, when a motor driving current flows to said coil L, said magnetic core 11 with said coil L generates a magnetic flux and the magnetic flux from the magnetic core makes a magnetic path in such a way that it passes the stator 12 through the concaved narrow portions 12a and 12b thereof and then back to the magnetic core 11, thereby forming a closed magnetic circuit.

In this occasion, since the closed magnetic loop consists of the magnetic core 11 and the stator 12, the magnetic permeability of the whole closed magnetic circuit is very high and the magnetic resistance thereof is very low. Therefore, an inductance is so large that the current flowing to the coil L does not reach a maximum at the instant when the current is applied thereto, but it is gradually increased.

But, at a certain current value, the closed magnetic circuit has a saturated magnetic flux in a portion where the cross sectional area of the magnetic path is the smallest, that is, the portions 12a and 12b of the stator 12 shown in FIG. 3.

As the narrow portions of the stator approaches to saturation, the magnetic permeability thereof is remarkably decreased and a stray flux is generated. At that time, since the magnetic permability of the concaved portions 12a and 12b of the stator 12 becomes smaller, in the closed magnetic circuit, the magnetic resistance is larger than the magnetic resistance at a time when the current begins to flow for the inductance which is decreased. Consequently, the current is rapidly increased from this time until it reaches the maximum.

In the meantime, the stray flux increases, and the stator 12 has a large magnetic potential difference across the straight edges 14a and 14b of the center hole 14 therein. The magnetic potential difference causes said rotor 15 to rotate.

Further, it is appreciated that the rotor becomes stationary with the magnetic poles attracted to straight edges 14a and 14b of the center holes in the stator 12 after rotating in a direction which is determined by the direction of the magnetic flux flowing from the coil L. Therefore, the stepping motor according to the present invention is regularly driven in a manner similar to the standard stepping motor. The magnetic path of the magnetic flux from the magnetic core flows through the closed magnetic circuit which is composed of the soft magnetic material. Further, on the rotor axis which is vertical to the direction of the magnetic path, the total cross sectional area of the stator is smaller than any cross sectional areas of the magnetic path in the closed mangetic circuit or the cross sectional area of the surface vertical to the direction of the magnetic path of the magnetic core so that it is not necessary to adjust the position of the stator. Furthermore, since the stator is formed of a single sheet as one rigid body, the center hole of the stator may be made with a high degree of accuracy at a low cost.

Referring now to the second embodiment of this invention shown in FIGS. 5–8, numeral 8 is a magnetic core on which is wound a coil winding 9, and a stator 12 which houses a rotor 17 is mounted to end portions of said core 8 by the screw bolts 10.

In FIG. 5, when a pulse of a given polarity is applied to the coil 9, the magnetic flux from said coil 9 is applied to the stator 12, said flux is passed to a coupling portion 22 and 23 via portions 18 and 19 of said stator 12 and to a constricted portion 20 and 21 of said stator 12. Further, when a reverse pulse is put into said coil winding 9, said flux is passed to said stator 12 in the reverse order. Said flux reaches saturation density due to the small cross sectional area of said coupling portion 22 and 23, and a magnetic potential difference is produced across the left hand side and the right hand side as the border of the "d" area in said coupling portion 22 and 23, and said flux activates said rotor 17.

In FIG. 6, the shape of said hole which houses said rotor 17 of said stator 12 has a generally circular shape as indicated by a dotted line in FIG. 6, and then the relation between the rotor angle $\theta$ and the magnetic potential energy P in FIG. 7 is stationary (stability point) at values of $0\pi$, and $2\pi$ in said rotor as indicated with a dotted line. Further, the housing shape of said stator 12 is designed to be asymmetric with respect to the X-axis orientation which passes the rotor axis of said rotor 17 as indicated by a solid line in FIG. 6, and then the relation between the rotor angle $\theta$ and the magnetic potential energy is stationary at values of $\theta$ of $\alpha$ and $\pi + \alpha$.

At that time, said flux is produced on said coil winding 9 and the magnetic field activates said rotor 17. The torque T of said rotor 17 which has the angle $\alpha$ to said magnetic field is as follows, $$T = KaHM \sin \theta$$

In the above formula, "K" is the proportional constant, "a" is the radius of said rotor, "H" is the magnetic field from said coil winding which activates said rotor, and "M" is the magnetization strength of said rotor 17.

FIG. 8 (a) to (s) respectively show housing portions of said rotor 17 in said stator 12 which are asymmetrical to said X-axis in FIG. 6. Of these, (a), (b), (h), (j), (k), (l), (n), (p), (s) in FIG. 8 are constituted in a point-symmetrical shape to the center of the rotation of said rotor, and the other figures show a point-asymmetrical shape to the center of the rotation of said rotor.

The setting of the point-symmetrical shape or the point-asymmetrical shape is decided by the working difficulty level of said housing shape of said rotor 17 in said stator 12 when said drive pulse applied to said coil winding 9. Now comparing the characteristic between the stator of the point-symmetrical shape in FIG. 8(h) and the stator of the point-asymmetrical shape in FIG. 8(i), the relation between said angle $\theta$ of said rotor and said magnetic potential energy P is represented by curve (N) in FIG. 7 as said stator of the point-symmetrical shape and by curve (M) as said stator of the point-asymmetrical shape.

Therefore, in order to obtain the same operational voltage of each stator, the stator which has the point-asymmetrical shape is more easily manufactured than the stator which has the point-symmetrical shape from the stand point of the dimension of the recess portion, the stator of the point-asymmetrical shape has a large recess dimension as compared to the stator of the point-symmetrical shape.

Further it if it is desired to form a small stator in view of the high speed stepping motor which operates many steps in one second, then the stator of the point-asymmetrical shape, which has a large recess portion, is suitable for this purpose. According to this invention, the treatment and the working of the construction are easily attained, further the slipping of the position of said stator by the impact and the vibration is effectively eliminated, whereby a stepping motor which has uniform performance is easily obtained.

Referring now to the third embodiment of this invention shown in FIGS. 9 to 12, numeral 23 is a stator which is composed of one plate as one unitary body, a core 24 which has a coil winding 25 is mounted to the end portions of said stator by the screw bolts 27 and 27 and, a circular hole 28 for positioning a rotor 30 is formed at a center portion of said stator. Said stator 23 has a thin and constricted necked portion which is located on the center line of said circular hole 28 whereby the magnetic reluctance becomes higher and the inductance of said coil winding 25 becomes smaller. A small recess portion 31 which is indicated in FIG. 9 and a small protrusive portion 32 which is indicated in FIG.

10 are respectively shaped to said circular hole 28, said recess and protrusive portions 31 and 32 determining the stationary position of said rotor 30. FIG. 11 and FIG. 12 respectively show a detailed embodiment for the stepping motor of this invention. In this occasion, said stator 23 is supported by an upper plate 34 and a lower plate 35. Said stator 23, said upper plate 34 and said lower plate 35 are respectively constructed as almost one body by screw bolts 27 and 27. A rotor axis 30a of said rotor 30 is rotatably supported by the guide pins 37 and 38 as the bearing members which are fixed to said upper plate 34 and said lower plate 35.

According to said stepping motor of this invention, said circular portion 28 of said stator which houses said rotor is composed of one plate. Therefore, the manufacturing of said stator and the attachment of said core 24 of said coil winding 25 are easily obtained. Further said air gap between said rotor 30 and said circular hole 28 is set in a reasonable and a precise scale, and said air gap is not changed by a mechanical impact. Said stationary position of said rotor 30 is determined by said small recess portion 31 and said small protrusive portion 32 in said circular hole 28. The rotation of said motor is stabilized by no slipping of said stator.

Referring now to the fourth embodiment of this invention shown in FIGS. 13 to 15, numeral 40 is magnetic core, a drive coil 41 is wound to said core 40, and a stator 42 is composed of stator elements 43 and 43a including the stator pieces 44 and 45. A plurality of stacked stator elements 43 are each composed of two stator pieces 44 and 45 and are magnetically and mechanically coupled to the end portions of said core 40 by the screw bolts 48 and 48. The opposite portions of said stator pieces 44 and 45 define an almost circular hole and cavity portion which has the inner portions 46 and 47. A rotor which has a pair of magnetic poles N and S and which is composed of a permanent magnet is concentrically and rotatably positioned in said circular hole and cavity portion via a bearing (not shown). A pair of end portions of said inner portions 46 and 47 in said stator pieces 44 and 45 respectively have the thin and sharp beak portions 50, 51, 52 and 53. A gap "d" is positioned between said beak portions 50 and 52 of said stator pieces 44 and said beak portion 51 and 53 of said stator piece 45. An upper and a lower stator elements 43a and 43a including said stator pieces 44 and 45 are constructed as one body by the coupling portions 54 and 55 and said beak portions 50 and 52.

Therefore a respective position of said stator pieces 44 and 45 are maintained in a stationary state by said stator elements 43a and 43a without the influence of external impact and the vibration. A recess portions 56 and 56 are shaped to said inner portions 46 or 47 of at least one stator element 43b of the stator elements 43 which constructs said stator 42. Therefore the location of said smaller point of a magnetically static potential energy which locates on the line of said stator pieces 44 and 45 is slipped, and then a flux distribution of said stator pieces 44 and 45 is changed according to said recess portion 56.

Therefore, the stationary position of the magnetic poles N and S in said rotor is biased to the slipped position against the connecting line of said stator pieces 44 and 45. The stationary position of said rotor 57 is able to be biased without enlarging the magnetic potential energy which increases by said recess portion, and then the changing of the magnetic potential energy is able to be small in case of the lower level of the working precise of said recess 56. In accordance with the invention, said recess portion 56 is mounted only to the part of said stator element.

Furthermore, said connecting portions 54 and 55 of said stator element 43a, which are constructed as one body, are desirable to be thin as far as keeping the mechanical strength and keeping a high magnetic resistance. Accordingly, the stepping motor of this invention is able to bias the stepping position of said rotor without adjusting the working of said stator by said stator which is composed of a plurality of stator elements and by the recess portion which is shaped to the part of said stator element. Further, a treating and a constructing operation of said stator are easily attained by a part of said stator elements which is constructed as one body. The slipping of the rotor position is not caused by an impact and vibration from outside so that a stepping motor which has a uniform performance is easily obtained.

Referring now to the fifth embodiment of the invention shown in FIG. 16 and FIG. 17, a coil winding 60 is wound to a magnetic core 61, a stator 62 is constructed as one rigid body and attached to said magnetic core 61 and, a rotor 64 is rotatably positioned within a generally circular opening of said core 61. The material of the magnetic core 61 has a high permeability which is higher than that of the material of said stator 62. Therefore, when the width of the magnetic core 61 is greatly reduced, it is possible to make the stator which surrounds the rotor 64 magnetically saturated in adjacent thereto. As a result, comparing a sectional area S2 of the magnetic core 61 of the present invention with the sectional area S1 of another magnetic core 61, it is appreciated that S2 is smaller than S1. As mentioned above, it is so small that said micro stepping motor of this invention is very useful for a compact watch.

What we claim is:

1. A micro stepping motor for use in compact watches and the like comprising: a magnetic core; a coil winding wound on said magnetic core; a stator composed of a solid one-piece plate having opposite end portions thereof connected to said magnetic core to define therewith a closed magnetic flux path, said stator having a symmetrical necked portion of reduced cross-sectional area along its length and having a circular hole extending through said stator at the center of said necked portion; a rotor having a pair of magnetic poles rotatably disposed in said hole with an air gap therebetween; and means disposed at only one site around the circumference of said hole and coacting with said rotor for determining the rotor stationary or rest position, said means for determining the rotor rest position comprising a recess in said stator and opening into said hole at said site thereby forming a region in the air gap of maximum reluctance for the rotor flux at said site so that said rotor assumes a rest position in which said pair of magnetic poles are equally spaced from said recess.

2. A micro stepping motor according to claim 1; wherein said stator necked portion is located midway along the length of said stator.

3. A micro stepping motor according to claim 1; wherein said stator necked portion has a concaved shape concaving inwardly towards said hole.

4. A micro stepping motor according to claim 3; wherein the total cross-sectional area of the concaved necked portion is less than that of said magnetic core.

5. A micro stepping motor according to claim 1; wherein said stator is composed of a one-piece elongated plate and said stator necked portion comprises a pair of concaved stator portions located at opposite sides of said plate.

6. A micro stepping motor for use in compact watches and the like comprising: a magnetic core; a coil winding wound on said magnetic core; a stator composed of a solid one-piece plate having opposite end portions thereof connected to said magnetic core to define therewith a closed magnetic flux path, said stator having a symmetrical necked portion of reduced cross-sectional area along its length and having a circular hole extending through said stator at the center of said necked portion; a rotor having a pair of magnetic poles rotatably disposed in said hole with an air gap therebetween; and means disposed at only one site around the circumference of said hole and coacting with said rotor for determining the rotor stationary or rest position, said means for determining the rotor rest position comprising a protrusion on said stator and protruding into said hole at said site thereby forming a region in the air gap of minimum reluctance for the rotor flux at said site so that said rotor assumes a rest position in which one of said magnetic poles aligns with and faces said protrusion.

7. A micro stepping motor according to claim 6; wherein said stator necked portion is located midway along the length of said stator.

8. A micro stepping motor according to claim 6; wherein said stator necked portion has a concaved shape concaving inwardly towards said hole.

9. A micro stepping motor according to claim 8; wherein the total cross-sectional area of the concaved necked portion is less than that of said magnetic core.

10. A micro stepping motor according to claim 6; wherein said stator is composed of a one-piece elongated plate and said stator necked portion comprises a pair of concaved stator portions located at opposite sides of said plate.

* * * * *